(12) United States Patent
McGuire et al.

(10) Patent No.: US 10,414,234 B2
(45) Date of Patent: Sep. 17, 2019

(54) DAMPER WITH TUNED VIBRATION ABSORBER

(71) Applicant: GM GLOBAL TECHNOLOGY OPERATIONS LLC, Detroit, MI (US)

(72) Inventors: Michael E. McGuire, Milford, MI (US); Robert P. Marble, White Lake, MI (US); Christopher A. Stirlen, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 190 days.

(21) Appl. No.: 15/415,921

(22) Filed: Jan. 26, 2017

(65) Prior Publication Data

US 2018/0208009 A1    Jul. 26, 2018

(51) Int. Cl.
| | |
|---|---|
| *F16F 1/00* | (2006.01) |
| *B60G 13/08* | (2006.01) |
| *B60G 13/16* | (2006.01) |
| *F16F 7/108* | (2006.01) |
| *F16F 9/18* | (2006.01) |
| *F16F 9/32* | (2006.01) |

(52) U.S. Cl.
CPC .............. *B60G 13/08* (2013.01); *B60G 13/16* (2013.01); *F16F 7/108* (2013.01); *F16F 9/182* (2013.01); *F16F 9/3221* (2013.01); *B60G 2202/24* (2013.01)

(58) Field of Classification Search
CPC .... F16F 9/5126; F16F 9/18; F16F 9/34; F16F 9/348; F16F 9/50; F16F 9/182; F16F 9/185; F16F 9/469; F16F 9/3271; F16F 15/032; F16F 2232/08; F16F 2222/12; F16F 2228/066; F16F 1/00; B60G 13/08; B60G 13/16; B60G 13/02; B60G 2202/24; B60G 17/08; B60G 2206/41; B60G 2232/08; B60G 2500/11
USPC ............... 188/266, 322.15, 322.17, 316, 317
See application file for complete search history.

(56) References Cited

U.S. PATENT DOCUMENTS

| | | | |
|---|---|---|---|
| 2,797,931 A | 7/1957 | Hans | |
| 5,263,560 A * | 11/1993 | Bayer | F16F 9/532 188/267 |
| 2002/0124403 A1* | 9/2002 | Eisenstock | B23P 19/04 29/890 |
| 2005/0011712 A1* | 1/2005 | Gotz | B60G 17/0528 188/298 |
| 2005/0109571 A1* | 5/2005 | Burkert | F16F 9/5126 188/322.15 |
| 2005/0178627 A1* | 8/2005 | Lemmens | F16F 9/3405 188/322.17 |

(Continued)

FOREIGN PATENT DOCUMENTS

| | | |
|---|---|---|
| DE | 2237058 A1 | 2/1974 |
| DE | 4029596 A1 | 3/1992 |

(Continued)

*Primary Examiner* — Robert A. Siconolfi
*Assistant Examiner* — San M Aung
(74) *Attorney, Agent, or Firm* — Quinn IP Law

(57) ABSTRACT

A shock absorber includes a first tube defining a first chamber and a piston head movably disposed within the first chamber. A hollow piston rod extends from the piston head. The hollow piston rod defines a rod chamber, and a tuned vibration absorber is disposed within the rod chamber of the hollow piston rod.

9 Claims, 3 Drawing Sheets

(56) References Cited

U.S. PATENT DOCUMENTS

| | | | | |
|---|---|---|---|---|
| 2007/0125610 A1* | 6/2007 | Goetz | ............... | F16F 9/3405 |
| | | | | 188/282.1 |
| 2008/0224437 A1* | 9/2008 | Vanhees | ............... | B60G 13/06 |
| | | | | 280/124.161 |
| 2009/0145708 A1* | 6/2009 | Kim | ............... | F16F 9/5126 |
| | | | | 188/322.15 |
| 2011/0079475 A1* | 4/2011 | Roessle | ............... | F16F 9/348 |
| | | | | 188/266.5 |
| 2014/0000997 A1* | 1/2014 | Tanaka | ............... | F16F 9/464 |
| | | | | 188/280 |
| 2015/0184716 A1* | 7/2015 | Teraoka | ............... | F16F 9/5126 |
| | | | | 188/297 |

FOREIGN PATENT DOCUMENTS

| | | | |
|---|---|---|---|
| DE | 102007049444 | A1 | 4/2009 |
| EP | 0505705 | A1 | 9/1992 |

\* cited by examiner

DAMPER WITH TUNED VIBRATION ABSORBER

This disclosure generally relates to suspension elements, such as those used in vehicles. Suspension systems allow relative movement between sprung and unsprung masses. In vehicular applications, the suspension system seeks to maintain contact between the wheels, or tracks, and the changing road surface over which the vehicle is moving.

SUMMARY

A shock absorber, such as may be used in a suspension system, is provided. The shock absorber includes a first tube defining a first chamber and a piston head movably disposed within the first chamber. A hollow piston rod extends from the piston head. The hollow piston rod defines a rod chamber, and a tuned vibration absorber is disposed within the rod chamber of the hollow piston rod.

The tuned vibration absorber includes a mass, a spring element, and a damper element. However, the spring element and the damper element may both be part of a unitary, first rubber biasing element. The tuned vibration absorber may also include a second rubber biasing element located opposite the mass from the first rubber biasing element. In some configurations, the shock absorber may include a second tuned vibration absorber opposite a fixed or floating plate member from the first tuned vibration absorber.

The above features and advantages, and other features and advantages, of the present subject matter are readily apparent from the following detailed description of some of the best modes and other embodiments for carrying out the disclosed structures, methods, or both.

DETAILED DESCRIPTION

Figure 1:
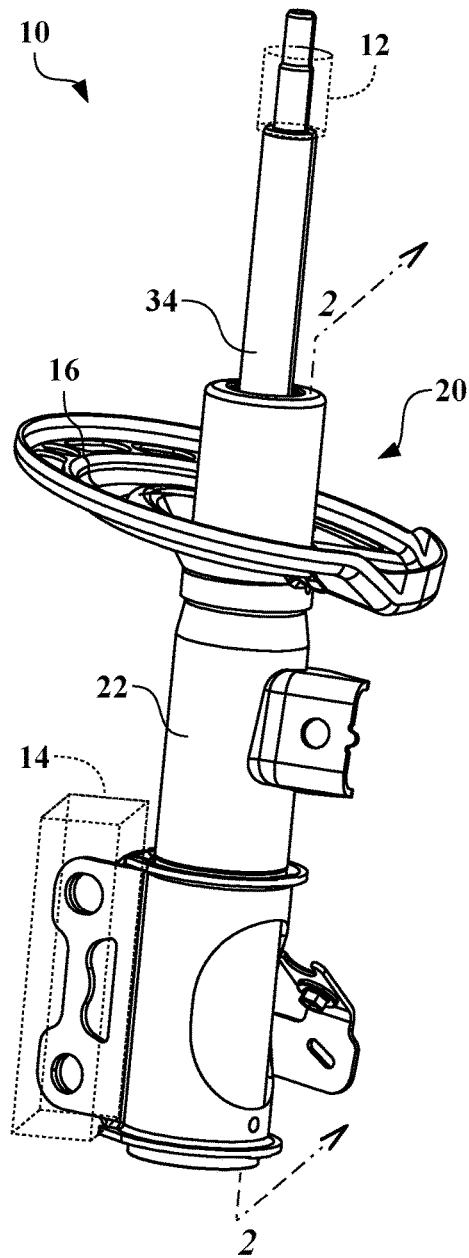
FIG. 1 is a schematic isometric view of a portion of a suspension system or apparatus.
Figure 2:
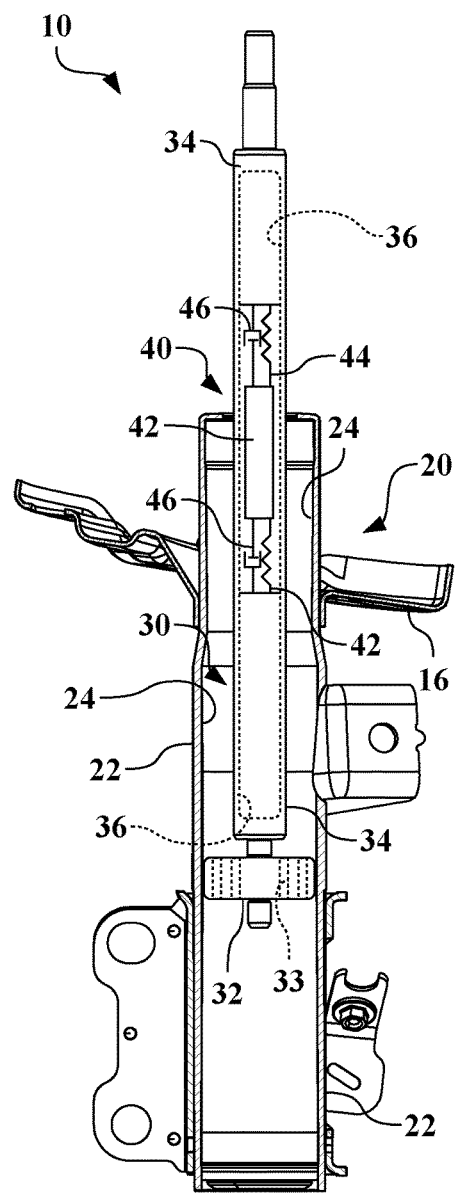
FIG. 2 is a schematic partial cross-sectional view of the suspension system or apparatus shown in FIG. 1, taken generally long line 2-2.

In the drawings, like reference numbers correspond to like or similar components whenever possible throughout the several figures. There is shown in FIG. 1 a schematic diagram of portions of a suspension apparatus 10 for a vehicle. The suspension apparatus 10 may be a portion of a suspension corner. FIG. 2 shows a partial cross section of the suspension apparatus 10, taken generally long line 2-2 of FIG. 1.

The vehicle, and any components incorporated therewith, may be representative of numerous types of vehicles, including planes, trains, automobiles, or any other rolling platform. Additionally, heavy industrial, construction, and mining equipment may incorporate features of the vehicle or the suspension apparatus 10 described herein.

The suspension apparatus 10 shown provides, in cooperation with other components, relative movement between a sprung mass 12 and an unsprung mass 14. The suspension apparatus 10 supports weight, absorbs and damps shock, and helps maintain contact between the road surface and the vehicle.

A spring support 16 may hold a spring element or spring, such as a coil spring (not shown). The spring support 16 and spring are located near a damper or shock absorber 20. The sprung mass 12 generally represents elements of the vehicle, such as the chassis, powertrain, and passenger compartment that are supported by the suspension apparatus 10; and the unsprung mass 14 generally represents the components, such as the wheels and tires, between the road surface and the suspension apparatus 10.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The shock absorber 20 includes at least a first tube 22, which defines a first chamber 24. In other configurations, the first tube 22 may be an interior tube, and the shock absorber 20 may also have a second tube (not shown). The second tube may be an outer tube, and may define a second chamber. In such a configuration, the first tube 22 is movable relative to the second tube.

A piston 30 is movably disposed within the first chamber 24. The piston 30 includes a piston head 32 and a hollow piston rod 34, which extends from the piston head 32. The piston head 32 is movably disposed within the first chamber 24, and the hollow piston rod 34 extends from the piston head 32 into, and possibly beyond, the first chamber 24. A plurality of holes 33 (shown in dashed lines and hidden from view in FIG. 2) may be formed through the piston head 32. The hollow piston rod 34 may be attached or affixed, opposite the piston head 32, to a portion of the sprung mass 12.

The piston 30 interacts with a hydraulic fluid to damp relative movement within the shock absorber 20. The piston 30 works within the shock absorber 20 to slow down and reduce the magnitude of movement between the sprung mass 12 and the unsprung mass 14 by turning kinetic energy into heat energy that can be dissipated through the hydraulic fluid.

In the configuration shown, the hydraulic fluid provides damping as it moves from one side of the piston head 32 to the other side. The movement may occur via small space between the piston head 32 and the walls of the first tube 22, or via the holes 33. Alternatively, where the shock absorber includes both the first tube 22 and the outer tube, damping may occur as the hydraulic fluid moves between the first chamber 24 and a chamber formed between the first tube 22 and the outer tube, such as via valve.

The hollow piston rod 34 defines a rod chamber 36, which is hidden from view and shown with dashed lines. As schematically illustrated in FIG. 2, a tuned vibration absorber or tuned mass damper, which may be referred to simply as TVA 40, is disposed within the rod chamber 36 of the hollow piston rod 34. The TVA 40 is illustrated in FIG. 2 by mechanical symbols. In the shock absorber 20, the TVA 40 of the shock absorber 20 shown in FIG. 2 includes at least one mass 42, at least one spring element 44, and at least one damper element 46.

Figure 3:
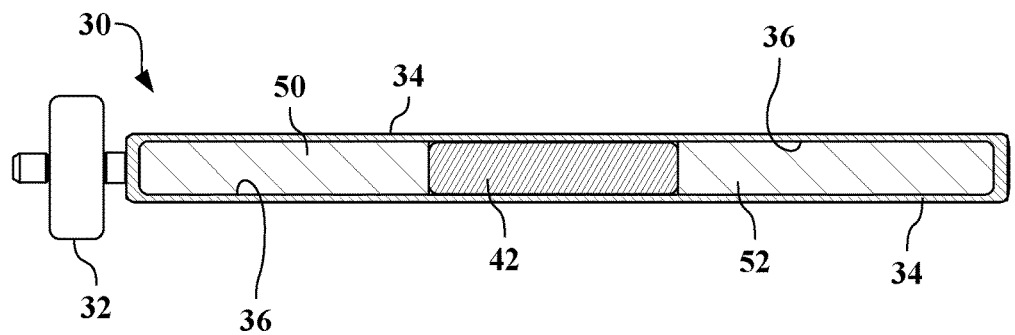
FIG. 3 is a schematic partial cross-sectional view of a piston of the suspension apparatus shown in FIG. 1, illustrating a tuned vibration absorber in greater detail.

Referring also to FIG. 3, and with continued reference to FIGS. 1-2, there is shown a detail view of the piston 30. In FIG. 3, the hollow piston rod 34 is partially sectioned, such that the TVA 40 is viewable.

In FIG. 3, the TVA 40 is illustrated with exemplary physical components, as contrasted with the mechanical symbols of FIG. 2. In the configuration illustrated in FIG. 3, the spring element 44 and the damper element 46 of the TVA 40 are part of a unitary, first rubber biasing element 50. The TVA 40 also includes a second rubber biasing element 52 located opposite the mass 42 from the first rubber biasing element 50. However, other configurations of the TVA 40 may have only the first rubber biasing element 50, such that only one side of the mass 42 is damped.

The first rubber biasing element 50 and the second rubber biasing element 52 provide both damping and springing functions within the TVA 40. The TVA 40 may absorb, in whole or part, vibrations passing through the shock absorber 20 between the unsprung mass 14 and the sprung mass 12.

The first rubber biasing element 50 and the second rubber biasing element 52 may be, for example and without limitation, high temperature silicone or silicone rubber. The first rubber biasing element 50 and the second rubber biasing element 52 both store energy and damp movement of the mass 42 through the length of the rod chamber 36. The mass 42 may be formed from metal, such as steel, and may be solid or may include holes or cavities to all fine-tuning of the amount of mass in the TVA 40. Alternatively, tuning of the mass 42 may selected by varying the size of the mass 42 or by varying the density of the metal, such that the actual mass is altered within the same relative volume.

In many configurations, the mass 42 will be shaped to substantially match the cross section of the rod chamber 36, such that there is little room for lateral movement or rattle of the mass 42 within the rod chamber 36. The reduce friction between the exterior of the mass 42 and the interior surface of the hollow piston rod 34 defining the rod chamber 36, the mass 42 may be coated in a friction-reducing material, such as a polytetrafluoroethylene (PTFE), or similar material, depending on the makeup of the hollow piston rod 34 and the mass 42 and on the coefficient of friction therebetween.

Figure 4:
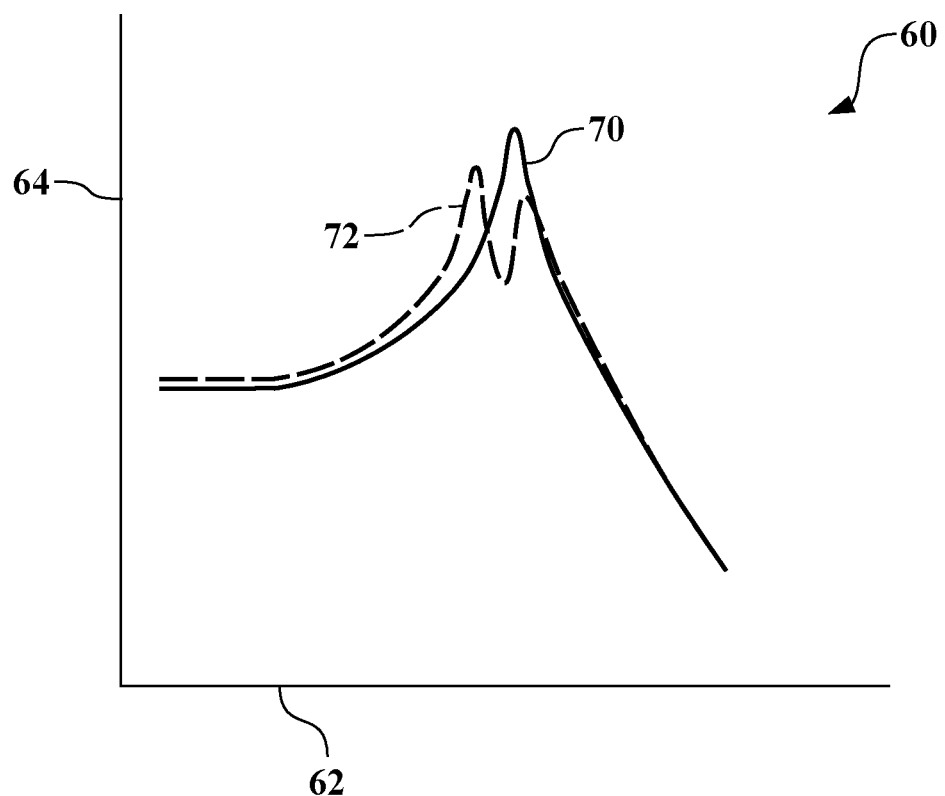
FIG. 4 is a schematic diagram or graph illustrating the general effect of the tuned vibration absorber on vibrations passing through the suspension apparatus.

Referring also to FIG. 4, and with continued reference to FIGS. 1-3, there is shown a schematic graph 60, which illustrates the general effect of the TVA 40 on the shock absorber 20. The graph 60 plots peak vibration of the suspension apparatus 10 with and without the TVA 40.

An x-axis 62 of the graph 60 shows frequency of vibrations introduced into the shock absorber 20. A y-axis 64 of the graph 60 shows the relative resonant force experience by the shock absorber 20 as a result of the vibrations. Note that both the x-axis 62 and the y-axis 64 may be logarithmic and that the value shown a simply schematic illustrations to demonstrate the general effect of the TVA 40 on the shock absorber 20.

A first curve 70 shows the effect of different frequencies on the shock absorber 20 without the TVA 40, such that vibrations are not counteracted or damped by the piston 30. The first curve 70 includes a single, relatively-large, peak.

A second curve 72, illustrated with a dashed line, shows the shock absorber 20 subjected to different frequencies with the TVA 40 located within the hollow piston rod 34, such that vibrations are absorbed or damped by the piston 30. As shown by the second curve 72, the TVA 40 effectively splits the peak, undamped, amplitude—as shown by the first curve 70—into multiple, lower-amplitude peaks. Therefore, the shock absorber 20 with the TVA 40 experiences reduced amplitudes relative to the shock absorber 20 having an empty rod chamber 36.

The TVA 40 stabilizes against unwanted motion caused by harmonic vibrations passing through the shock absorber 20. When tuned for the specific suspension assembly 10, shock absorber 20, and vehicle, the TVA 40 reduces specific vibrations of the suspension assembly 10 so that undesirable vibrations are minimized.

The TVA 40 may be tuned to reduce or eliminate specific types, or sources, of vibration passing through the suspension apparatus 10 into the sprung mass 12 of the vehicle. These vibrations may include, without limitation, smooth road shake or those caused by washboard road surfaces. The mass 12 may be sized to have a mass of between five to twenty-five percent the mass of the piston 30—i.e., five to twenty-five percent of the moving components to which the TVA 40 is attached.

Figure 5:
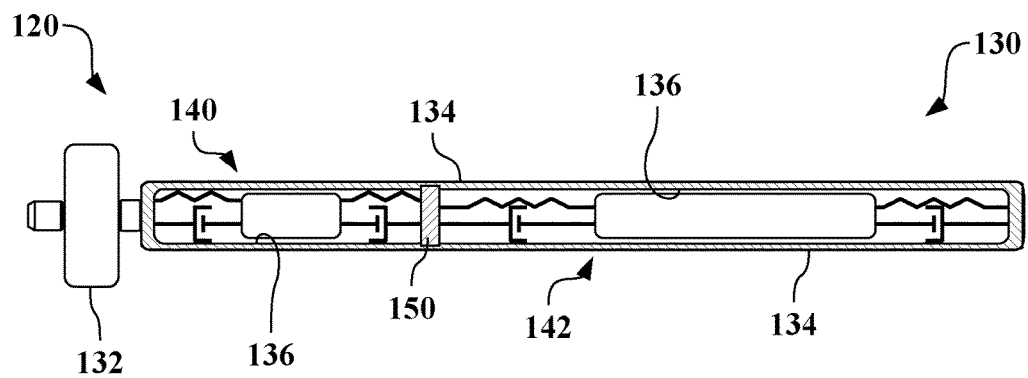
FIG. 5 is a schematic partial cross-sectional view of another piston that may be used with a suspension apparatus similar to that shown in FIG. 1, illustrating two tuned vibration absorbers on either side of a fixed plate.

Referring also to FIG. 5, and with continued reference to FIGS. 1-4, there is shown a schematic plan view of a portion of a shock absorber 120. FIG. 5 illustrates a piston 130 of the shock absorber 120. The piston 130 interacts with a fluid to damp movement of the shock absorber 120.

The piston 130 includes a piston head 132 and a hollow piston rod 134, which extends from the piston head 132. The hollow piston rod 134 defines a rod chamber 136.

A tuned vibration absorber or tuned mass damper, which may be referred to simply as a first TVA 140, is disposed within the rod chamber 136 of the hollow piston rod 134. The piston 130 also includes a second TVA 142 located within the rod chamber 136.

The first TVA 140 and the second TVA 142 are illustrated in FIG. 5 by mechanical symbols. A plate member, fixed plate, or simply plate 150, is fixedly attached to the hollow piston rod 134 between the first TVA 140 and the second TVA 142. Therefore, the first TVA 140 and the second TVA 142 move relative to the fixed plate 150 and the hollow piston rod 134. The first TVA 140 and the second TVA 142 may absorb, or eliminate, a wider range of vibration modes passing through the piston 130, relative to the single TVA 40 of the shock absorber 20.

Figure 6:
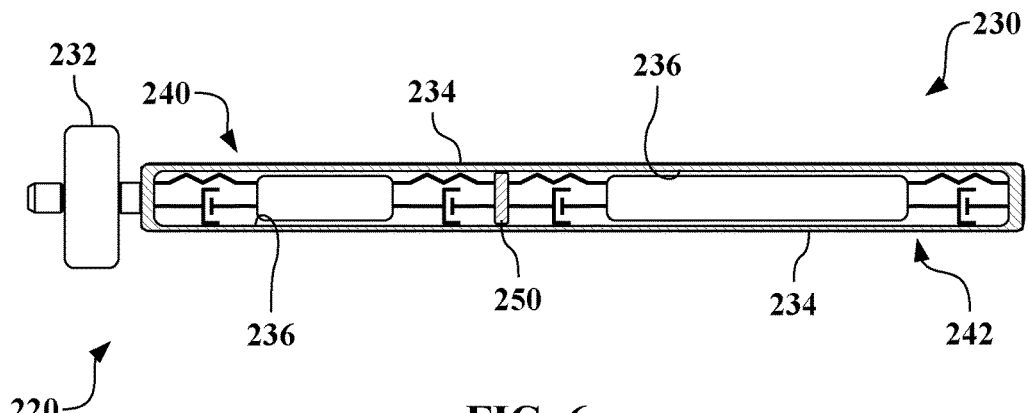
FIG. 6 is a schematic partial cross-sectional view of another piston that may be used with a suspension apparatus similar to that shown in FIG. 1, illustrating two, compounded, tuned vibration absorbers.

Referring also to FIG. 6, and with continued reference to FIGS. 1-5, there is shown a schematic plan view of a portion of a shock absorber 220. FIG. 6 illustrates a piston 230 of the shock absorber 220. The piston 230 interacts with a fluid to damp movement of the shock absorber 220.

The piston 230 includes a piston head 232 and a hollow piston rod 234, which extends from the piston head 232. The hollow piston rod 234 defines a rod chamber 236.

The piston 230 includes a first TVA 240 and a second TVA 242, both of which are movably disposed within the rod chamber 236. The first TVA 240 and the second TVA 242 are illustrated in FIG. 6 with mechanical symbols.

A plate 250, is disposed between the first TVA 240 and the second TVA 242. However, the plate 250 movable within, as opposed to being fixed to, the hollow piston rod 234. The plate 250 is schematic of any structure or connection between the first TVA 240 and the second TVA 242, such that the first TVA 240, the second TVA 242, and the plate 250 move relative to the hollow piston rod 234.

In the configuration shown in FIG. 6, the first TVA 240 and the second TVA 242 are compounded, such that interaction between the first TVA 240 and the second TVA 242 may absorb, or eliminate, several modes of vibration occurring in the piston 230.

The detailed description and the drawings or figures are supportive and descriptive of the subject matter discussed herein. While some of the best modes and other embodiments for have been described in detail, various alternative designs, configurations, and embodiments exist.

The invention claimed is:

1. A shock absorber, comprising:
    a first tube defining a first chamber;
    a piston head movably disposed within the first chamber;
    a hollow piston rod extending from the piston head, wherein the hollow piston rod defines a rod chamber; and
    a tuned vibration absorber disposed within the rod chamber of the hollow piston rod, wherein the tuned vibration absorber includes:
        a mass formed from steel and coated in PTFE;
        a spring element;
        a damper element; and
        wherein the spring element and the damper element are part of a unitary, first rubber biasing element formed from silicone rubber.

2. The shock absorber of claim 1, wherein the tuned vibration absorber includes:
    a second rubber biasing element located opposite the mass from the first rubber biasing element.

3. The shock absorber of claim 1, wherein the tuned vibration absorber is a first tuned vibration absorber, and further comprising:
    a plate member fixed to the hollow piston rod
    a second tuned vibration absorber opposite the plate member from the first tuned vibration absorber.

4. The shock absorber of claim 1, wherein the tuned vibration absorber is a first tuned vibration absorber, further comprising:
    a second tuned vibration absorber; and
    a plate movable within the hollow piston rod between the first tuned vibration absorber and the second tuned vibration absorber, such that the first tuned vibration absorber, the second tuned vibration absorber, and the plate move relative to the hollow piston rod.

5. The shock absorber of claim 2,
    wherein the second rubber biasing element is formed from silicone rubber.

6. A suspension system, comprising:
    a sprung mass;
    an unsprung mass;
    a spring disposed between the sprung mass and the unsprung mass; and
    a shock absorber disposed, and providing relative movement, between the sprung mass and the unsprung mass, the shock absorber including:
        a first tube fixed relative to one of the sprung mass and the unsprung mass, and defining a first chamber;
        a piston fixed relative to the other of the sprung mass and the unsprung mass, and having a piston head movably disposed within the first chamber and a hollow piston rod extending from the piston, wherein the hollow piston rod defines a rod chamber; and
        a tuned vibration absorber disposed within the rod chamber of the hollow piston rod, wherein the tuned vibration absorber is a first tuned vibration absorber, and further includes:
            a plate member fixed to the hollow piston rod; and
            a second tuned vibration absorber opposite the plate member from the first tuned vibration absorber.

7. A suspension system, comprising:
    a sprung mass;
    an unsprung mass;
    a spring disposed between the sprung mass and the unsprung mass; and
    a shock absorber disposed, and providing relative movement, between the sprung mass and the unsprung mass, the shock absorber including:
        a first tube fixed relative to one of the sprung mass and the unsprung mass, and defining a first chamber;
        a piston fixed relative to the other of the sprung mass and the unsprung mass, and having a piston head movably disposed within the first chamber and a hollow piston rod extending from the piston, wherein the hollow piston rod defines a rod chamber; and
        a tuned vibration absorber disposed within the rod chamber of the hollow piston rod, wherein the tuned vibration absorber is a first tuned vibration absorber, and further includes:
            a second tuned vibration absorber; and
            a plate movable within the hollow piston rod between the first tuned vibration absorber and the second tuned vibration absorber, such that the first tuned vibration absorber, the second tuned vibration absorber, and the plate move relative to the hollow piston rod.

8. The suspension system of claim 6,
    wherein the first tuned vibration absorber includes a first mass and a first rubber biasing element;
    wherein the first mass is formed from steel and coated in PTFE;
    wherein the second tuned vibration absorber includes a second mass and a second rubber biasing element;
    wherein the second mass is formed from steel and coated in PTFE; and
    wherein the first rubber biasing element and the second rubber biasing element are formed from silicone rubber.

9. The suspension system of claim 7,
    wherein the first tuned vibration absorber includes a first mass and a first rubber biasing element;
    wherein the first mass is formed from steel and coated in PTFE;
    wherein the second tuned vibration absorber includes a second mass and a second rubber biasing element;
    wherein the second mass is formed from steel and coated in PTFE; and
    wherein the first rubber biasing element and the second rubber biasing element are formed from silicone rubber.

* * * * *